April 14, 1931.  T. FRASER  1,801,195
PROCESS OF AND APPARATUS FOR SEPARATING MIXED MATERIALS
Filed Oct. 31, 1927
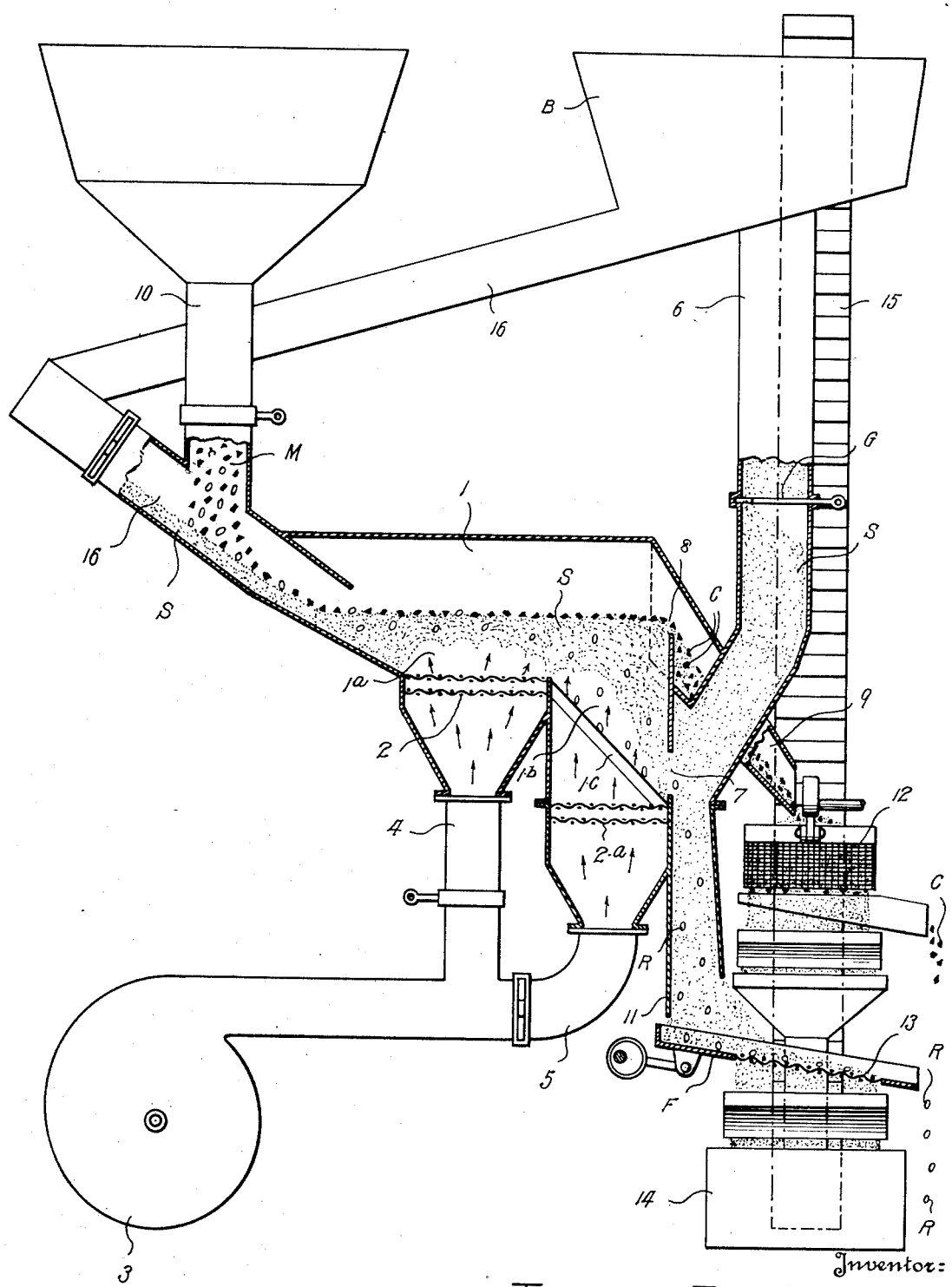
Inventor:
THOMAS FRASER
By Ogle R. Singleton
Attorney.

Patented Apr. 14, 1931

1,801,195

UNITED STATES PATENT OFFICE

THOMAS FRASER, OF PITTSBURGH, PENNSYLVANIA, ASSIGNOR TO HYDROTATOR COMPANY, OF HAZLETON, PENNSYLVANIA, A CORPORATION OF DELAWARE

PROCESS OF AND APPARATUS FOR SEPARATING MIXED MATERIALS

Application filed October 31, 1927. Serial No. 229,964.

The present invention relates more particularly to certain improvements in the process of separating loosely mixed materials by floating the lighter material in a dry fluid medium, or quick-sand, which process was described and claimed in United States Letters Patent Number 1,534,846, granted April 21st 1925, to Thomas Fraser, the applicant herein, and Harry F. Yancey, as joint inventors. The novel feature of the present invention is the combination with the buoyant effect of the dry fluid medium disclosed in the above mentioned patent, of the segregating effect secured by imparting motion to the fluid medium, which will cause the mixed materials in the fluid medium to segregate according to specific gravity; that is, motion which tends to separate the loosely mixed particles in the fluid medium into segregated groups of particles of like specific gravity.

The effect of such segregating motions is well known, and they have been widely used for the separation of particles of different specific gravities, when immersed in water or subjected to the buoyant effect of an air blast. Some of these segregating motions which affect the materials under treatment are:

1. A continuous upward movement of a fluid medium, so adjusted that the velocity of the rising current will be intermediate the velocities at which the two kinds of particles to be separated will settle through the medium.

2. A pulsating upward flow of the fluid medium which alternately lifts the mixed materials (having the greater lifting effect on the lighter material) and then permits them a period of free settlement through the fluid medium in a quiet state.

3. A stream-like flow of the fluid medium which sorts the materials immersed in it, because of its greater carrying effect on the lighter material.

These various forms of segregating motions, and combinations and modifications thereof have long been successfully used for separating materials immersed in water or air.

In my improved process, segregating motion is used in combination with the buoyant effect of the unique dry fluid medium disclosed in United States Letters Patent Number 1,534,846, above mentioned. That is, the materials to be separated are subjected to the effect of one of these segregating motions while immersed in and subject to the buoyant effect of the dry fluid medium, which may aptly be described as "dry quicksand." Thus I obtain the advantage of those well established principles of segregation by motion and also the advantage of the use of a heavy dry fluid which does not wet the materials under treatment, and has the great superiority over air as a fluid, in that it is much heavier. Consequently a much wider range of sizes of particles can be treated than in a process using air as the fluid medium.

It must be understood that the term "segregating motion" as applied to movement of the medium refers distinctly to an "en masse" movement of the body of fine solids or a substantial part thereof; and it does not refer to the internal vibratory movement of individual particles in the mass which is caused by the aeration and which causes the mass to become fluid.

An apparatus in which my improved process may be carried out is shown in cross section in the accompanying drawing.

The dry fluid medium is produced in the container 1 which has a pervious bottom 2, 2—a. The chamber 1 is filled with dry pulverulent material S, and air is supplied by the fan 3 through ducts 4 and 5, passing up through the mass of material S in the chamber 1. This aeration distends the body of material S, throws the individual particles into movement, and the mass of fine particles assumes the characteristics of a fluid. In this condition the mass will flow and rise under head or pressure. A sand feed pipe 6 which communicates with the interior of the chamber 1 through the opening 7, is connected at its top with an overhead bin B which contains the stock of the material S being used to form the fluid medium. When the material S in the chamber 1 is fluidized, as above described, the head of material S in the bin B and pipe 6 causes the material S to flow through the opening 7 into the chamber 1, where it is fluidized and forced to rise through the chamber 1 under the pressure due to the head maintained in the pipe 6. As long as head of material S is maintained in the pipe 6, a current of fluidized material S will rise through the chamber 1 and overflow at 8 into the chute 9 which discharges it from the apparatus. The rate of flow may be controlled by a suitable gate G in the pipe 6.

The mixed materials M to be separated are fed into the apparatus through the chute 10 and are immersed in the fluid mass of aerated material S in 1—a, the shallow part of the chamber 1, and this mass of material S is forced across the part 1—a by the flow of materials M behind it, and enters the deeper part 1—b of the chamber 1. Here the materials M are subjected to the segregating action of the rising current of fluid material S which carries the lighter particles C up and over the overflow at 8 to the chute 9. In this way the lighter material C is removed from the apparatus. The heavier particles R which are too heavy to be lifted by the combined buoyant effect of the fluid medium and the segregating effect of the rising current sink to the bottom of the part 1—b which is provided with a bar screen 1—c which guides the heavier material R toward the opening 7 through which it passes into the discharge chute 11. A suitable feeder F at the bottom of the chute 11 discharges the mixture of heavy particles H and material S from the chute 11 at a uniform rate so as to prevent an out-rush of the discharge. A uniform flow through the chute 11 and feeder F carries away the heavier products R which sink to the bottom of the apparatus. This outflow from the chute 11 and the overflow at 8 are replenished by inflow of the material S through the pipe 6. In operation, the two products after being discharged from the chamber 1 are passed over screens 12 and 13 which take out the material S which is collected in an elevator bin 14 and returned by an elevator 15 to the bin B which supplies the material S to the pipe 6. The material S is therefore circulated continuously.

In this apparatus, the effect of stream-like flow may also be secured if desired by feeding a stream of the material S through a chute 16 from the bin B into the container 1 at a point below the feed chute 10 so as to maintain a continual flow of the material S across the chamber 1 and over the overflow at 8. The material M is fed into the stream from the chute 10 and is carried along by the stream. In the shallow part 1—a of the chamber 1, the particles are classified by the segregating effect of the flowing stream of fluidized material S. The heavier particles R tend to collect at the bottom and the lighter material C buoyed up by the fluid medium and the carrying power of the stream are swept along in the upper part of the stream and carried out of the container 1 at the overflow 8. The heavier particles R are discharged through the chute 11 as described above. Obviously a rising current of the material S from the pipe 6 through the part 1—b may be used at the same time, if desired.

Thus, in various ways such as these, "en masse" movements of the fluid medium may be used in combination with the float-and-sink separating action of the dry fluid medium described in United States Letters Patent Number 1,534,846, above mentioned. It is obvious that if the fluid medium is intermediate in specific gravity between the specific gravities of the two materials to be separated, then no supplementary segregating motion is necessary or desirable, for the separation will be achieved simply by flotation of the lighter material and sinking of the heavier material. However, when the segregating effect of motion is added to the buoyant effect of the fluid medium, it is not necessary to have the fluid medium heavier than the light material and herein lies the principal advantage of the present invention.

The specific advantages obtained may be enumerated:

1. A comparatively light material, such as ordinary silica sand or fine coal, may be used as the "sand" material for forming the dry fluid medium to separate heavier substances which would require the use of some heavy and perhaps costly material, such as magnetite, in order to produce a medium heavy enough to float the lighter particles of the feed, without such supplementary segregating effect of motion.

2. The separation may be regulated by varying the supplementary segregating motion, and the adjustment of the air flow may therefore be set so as to obtain a maximum fluidity of the medium, which facilitates rapid separation and increases capacity.

As used in this specification, the term "dry fluid medium" may be defined as a mass of finely divided solid particles fluidized by passing air or other gaseous fluid through the mass, substantially as described in United States Letter Patent Number 1,534,846, above mentioned, and the term "sand" where used in referring to this "dry fluid medium" may be defined as any finely divided solid material not necessarily ordinary silica sand.

Having described my invention, what I claim is:

1. The process of separating mixed materials which consists in producing a flowing mass composed of individually moving dry particles, and introducing the materials into said mass.

2. The process of separating mixed materials which consists in subjecting the materials to the buoyant effect of a dry pulverulent fluid medium and to the segregating effect of translating motion imparted to the mass formed by the materials in the medium.

3. The process of separating mixed materials which consists in subjecting the materials to the buoyant effect of dry quick-sand, in combination with the segregating effect resulting from en-mass motion imparted to the mass, formed by the materials in the quick-sand.

4. The process of separating mixed materials which consists in producing a dry fluid medium by injection of an agitating agent into a mass of loose finely divided matter, imparting en-mass movement to said medium, and commingling the mixed materials with said agitated moving medium.

5. The process of separating mixed materials which consists in producing a separating medium by injecting air into a mass of sand, imparting translating movement to the sand and commingling the mixed materials with the moving separating medium.

6. The process of separating mixed materials which consists in creating a current of dry loose finely divided matter, injecting air into said matter, and introducing the mixed materials into said current.

7. The process of separating mixed materials which consists in creating a horizontally flowing stream of dry loose finely divided matter, injecting air into said matter, and imposing said mixed materials upon said stream.

8. In apparatus for separating mixed materials, the combination with a container, of a mass of finely divided material therein; means for causing the said mass to have a dry fluid condition; means for commingling the mixed materials with said mass; and means for causing segregating en-mass motion of said mass.

9. In apparatus for separating mixed materials, the combination of a chamber; a supply chute entering said chamber at its upper part on one side; a discharge chute leading from said chamber at its other side; pipes entering the bottom of said chamber; a second chamber in communication with the first chamber through an opening; a discharge chute from the lower part of said second chamber; and a mass of sand adapted to be fluidized to flow through said chambers.

10. In apparatus for separating mixed materials, the combination of a chamber; a supply chute entering said chamber at its upper part on one side; a discharge chute leading from said chamber at its other side; pipes entering the bottom of said chamber; a second chamber in communication with the first chamber through an opening; a supply chute entering the top of said second chamber; a discharge chute from the lower part of said second chamber; a bin so disposed as to receive material from both discharge chutes; a second bin so disposed as to supply material to both supply chutes; and an elevator so disposed as to move material from the first bin to the second bin.

In testimony whereof I affix my signature.

THOMAS FRASER.